S. MAPES.
Thrashing Machine.
No. 92,735.  Patented July 20, 1869.
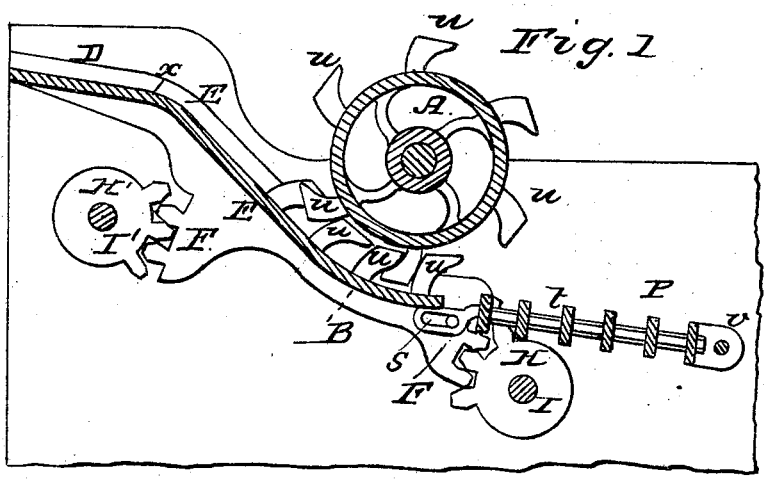
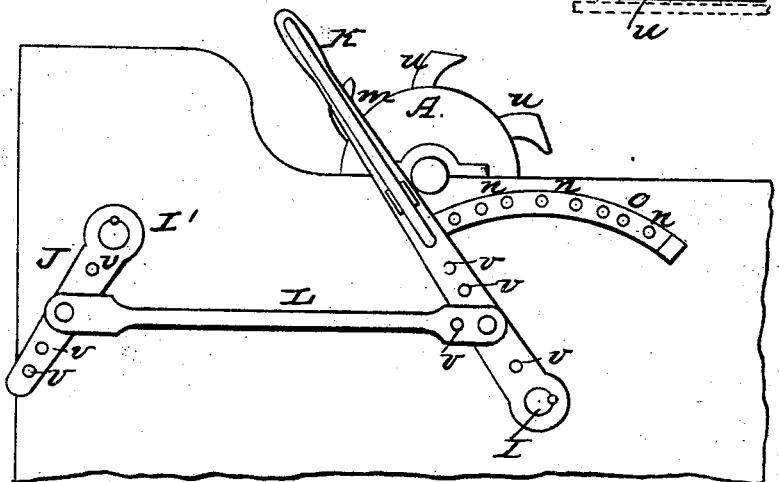
WITNESSES  
INVENTOR

United States Patent Office.

STEPHEN MAPES, OF BUFFALO, NEW YORK.

Letters Patent No. 92,735, dated July 20, 1869.

IMPROVEMENT IN THRESHING-MACHINES.

The Schedule referred to in these Letters Patent and making part of the same.

*To all whom it may concern:*

Be it known that I, STEPHEN MAPES, of the city of Buffalo, in the county of Erie, and State of New York, have invented certain new and useful Improvements in Threshing-Machines; and I do hereby declare that the following is a full and exact description thereof, reference being had to the accompanying drawing, making part of this specification.

In threshing the various kinds of grain and seed, the main operation, that of detaching or loosening the grain from the straw, is almost universally accomplished by the same mechanism, however much the various machines employed may differ in other respects, which mechanism consists of a toothed cylinder and concave, between which the material to be threshed is passed.

To most perfectly perform this operation requires, for the different kinds of grain, a corresponding change in the arrangement of these parts.

For threshing wheat, for instance, the concave should be concentric with, and close to the cylinder. For barley, oats, and peas, the concave should remain concentric, but be adjusted further from the cylinder; while clover requires an eccentric adjustment, so that the distance between the concave and cylinder will diminish from the mouth or side where the material enters to the lower side or point of discharge.

To enable this required adjustment to be readily effected, is the main object of my improvements.

Making the concave adjustable is old and well known, and such, broadly, I do not claim.

My invention consists—

First, in adjusting the concave bodily to or from the cylinder, by means of four toothed segments or equivalent mechanism, forming supports therefor, and so arranged and connected together as to enable the adjustment to be effected by the movement of a single arm or lever.

Second, in the arrangement of the arm, connecting-rod, and lever, with the two shafts to which the segments are attached, by means of which the four segments are simultaneously operated by a single movement of the actuating-lever.

Third, in the manner of adjusting the rod connecting the upper and lower pairs of segments, whereby the concave can be concentrically or eccentrically adjusted, as may be required.

Fourth, in hinging the grain rack at one end, and connecting it to the concave at the other by means of slots and a rolling rod, or *vice versa*, so as to permit the said screen to yield with the adjustment of the concave, without destroying its connection therewith.

Fifth, in making the sides of the teeth of the cylinder and concave with a uniform taper, so that when the latter is adjusted to or from the cylinder, the distance between the teeth of the two will be correspondingly lessened or increased, whereby the purpose of adjustment is more perfectly effected.

Sixth, in constructing the lower end of the feed-table, near where it connects with the concave, with a curve, so that the change of inclination from the one to the other will be gradual, and prevent the sudden tipping up in the face of the feeder of the buts of the straw, as it passes over the ridge or junction, which takes place to a greater or less degree in machines as they have heretofore been constructed.

In the accompanying drawings—

Figure 1 is a longitudinal vertical section through the cylinder, concave grain-screen and feed-table of a threshing-machine.

Figure 2 is a side elevation, showing the actuating-lever and connecting parts for adjusting the concave.

Figure 3 is a diagram, representing the construction and operation of my improved taper teeth, in connection with an adjustable concave.

Like letters of reference designate like parts in each of the figures.

A is the cylinder, which may be of any usual and suitable construction;

B is the concave; and

D the feed-table, shown combined in one piece.

E E are two side castings, extending longitudinally of the machine, between which the concave and feed-table are secured together.

F F are racks formed in the lower ends of these side pieces; and

F' F', similar racks formed at or a little above the upper edge of the concave, underneath the feed-table.

H H' are two pairs of toothed segments, attached respectively to the two shafts I I'.

These shafts are arranged horizontally and transversely of the machine, with their bearings supported by the sides of the machine.

The segments H are arranged so as to gear with the racks F, and support the lower portion of the concave, while the segments H' gear with the racks F', and support the feed-table and upper portion of the concave, as clearly shown in fig. 1.

One end of the shafts I I' extend outside of the machine, (as shown in fig. 2,) and have attached respectively thereto an arm J and lever K.

These are connected by a rod L, the ends of which may be adjusted at a greater or less distance from the shafts or centre of motion, as required, and be secured by a bolt fitting in any of the series of holes *v v*.

The ends of the connecting-rod being adjusted at equal distances from the shafts, as shown, it is evident that the moving of the lever K, will cause an equal movement of the two shafts I I', and the segments attached thereto. This will adjust the concave to or from the cylinder according to the direction in which the lever is turned, without destroying its concentricity.

To produce an unequal or eccentric adjustment of the concave, the relative lengths of the arms between the ends of the connecting-rod and the shafts are changed, so that a movement of the lever K will produce an unequal movement of the segment-shafts, the amount of which difference can obviously be regulated by adjusting the connecting-rod.

The lever L is retained in place by a pin at the end of the spring-lever m, which extends through the lever L, and fits in any of the series of holes n n, in a plate O, attached to the side of the machine.

Any other suitable device, however, for the purpose, may be employed instead, if desired.

P represents the grain-rack, connecting with the lower portion of the concave.

To enable the concave to be adjusted without destroying the connection between it and the screen, requires that this connection, or the connection at the opposite end of the screen, be made so as to permit a slight play lengthwise of the machine.

In the drawings, the screen is shown as hinged at the rear to the sides of the machine, as indicated at b, and united at the front to the concave by a transverse rod r, which loosely fits in the ends of the side pieces E, and passes through slots s in the ends of the longitudinal rods or bars t of the rack, and rolls therein. This coupling permits the necessary yielding as the concave is adjusted.

The roller r greatly lessens the friction of the parts.

The teeth of cylinders and concaves for threshing-machines, have heretofore been made with a slight and irregular taper to the sides thereof, the outer and operative portion of the teeth being formed with scarcely any taper thereto. With teeth constructed in this manner, the adjustment of the concave to or from the cylinder does not materially increase or lessen the distance between the teeth of the two, so that the purpose of the adjustment is only imperfectly accomplished. The object of the fifth feature of my invention is to obviate this difficulty.

In accomplishing this, I make my teeth n n, with a regular and uniform taper to the sides thereof, and of such a degree that the adjustment of the concave will produce a change in the distance between the teeth, the distance increasing as the concave is withdrawn, and diminishing as it is adjusted toward the cylinder, as clearly shown in fig. 3.

It must be manifest that this change in the construction of the teeth when combined with an adjustable concave becomes a matter of considerable importance, for without such a conjoint change, the action of the threshing-material on the material will be unequal, as the spaces between the ends of the teeth and the cylinder or concave would greatly vary at times from that between the teeth themselves, so that the material at the one point would be less and differently acted on from what it is at the other.

In the arrangement of the feed-table, it is essential that the front portion of it, or that on which the grain is first deposited, should be but slightly inclined, so as to enable the feeder to properly loosen and distribute it over the same before it passes to the cylinder. Heretofore the feed-table has been constructed with a plane surface and a uniform inclination to its junction with the concave. In such case the difference between the inclination of the concave and feed-table was such as to make quite a ridge or angle at the junction, so that the heads of the straw would strike against the cylinder, and be, by the action thereof, forced down between it and the concave, causing the buts of the straw to violently kick up as the latter passed over the ridge at the junction. This has the effect to entangle the straw with the teeth, and occasions a material waste of power, and an obstruction to the proper and free action of the cylinder.

By constructing the lower portion of the feed-table with a gradual curve, (as shown at x,) so that the straw in passing over it will have changed its inclination before it reaches the concave, and pass between the same and cylinder at a proper inclination, the threshing is effected more easily and perfectly, while the but portion of the straw offers comparatively little resistance in its passage through the machine.

In the use of my improved means for adjusting the concave, the actuating-lever L extends upward, preferably on the right side of the machine, within convenient reach of the feeder, who, as he grasps the end of the lever, also at the same time releases the same, by pressing on the small lever which extends alongside the handle of the main lever, whereby the concave can be lowered in an instant. This, in case of stones or other articles being observed in the straw, is of great importance, as the concave, in such instances, can usually be lowered away from the cylinder before the article gets between the teeth, whereby the danger of breaking the machine and of injuring the feeder is avoided.

Having thus described my invention,

What I claim, and desire to secure by Letters Patent, is—

1. The segments H H', and racks F F', or their equivalents, when arranged and connected together so as to be simultaneously actuated by a single lever, for adjusting the concave, substantially as set forth.

2. In combination with the two pairs of segments H H', and shafts I I', the arm J, lever K, and connecting-rod L, operating substantially in the manner and for the purpose set forth.

3. The manner of adjusting the connecting-rod L, so as to enable the concave to be eccentrically adjusted by a movement of the lever K, substantially as set forth.

4. Hinging the grain-rack P, and connecting it with the adjustable concave by means of the rod and roller r, and slotted bars t, as herein set forth.

5. Making the sides of the teeth of the cylinder and concave with a uniform taper, when combined and operating with an adjustable concave, in the manner and for the purpose shown and described.

6. Constructing the feed-table with the curve or bend x, as shown, and so arranged as to cause the grain, before it reaches the cylinder, to assume the proper inclination for passing between it and the concave, as herein set forth.

STEPHEN MAPES.

Witnesses:
 JNO. J. BONNER,
 VICTOR H. BECKER.